(12) United States Patent
Xu et al.

(10) Patent No.: US 8,174,159 B2
(45) Date of Patent: May 8, 2012

(54) OPTIMIZED MULTI-PHASE ARMATURE WINDING

(75) Inventors: Ming Xu, Oro Valley, AZ (US); Wayne Pearson, Oro Valley, AZ (US); Cristian Anghel, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 251 days.

(21) Appl. No.: 12/175,254

(22) Filed: Jul. 17, 2008

(65) Prior Publication Data

US 2010/0013342 A1   Jan. 21, 2010

(51) Int. Cl.
| | |
|---|---|
| *H02K 1/00* | (2006.01) |
| *H02K 3/00* | (2006.01) |
| *H02K 17/00* | (2006.01) |
| *H02K 21/00* | (2006.01) |
| *H02K 23/26* | (2006.01) |
| *H02K 27/02* | (2006.01) |

(52) U.S. Cl. ........ 310/198; 310/179; 310/180; 310/184; 310/189; 310/200; 310/201

(58) Field of Classification Search ................. 310/179, 310/180, 184, 189, 198, 200, 201; H02K 1/00, H02K 3/00, 17/00, 21/00, 23/26, 27/02
See application file for complete search history.

(56) References Cited

U.S. PATENT DOCUMENTS

| | | | | | |
|---|---|---|---|---|---|
| 3,652,888 | A | * | 3/1972 | Harrington | 310/198 |
| 3,739,213 | A | * | 6/1973 | Willyoung | 310/198 |
| 3,949,253 | A | * | 4/1976 | Broadway et al. | 310/184 |
| 3,979,618 | A | * | 9/1976 | Auinger | 310/198 |
| 4,144,470 | A | * | 3/1979 | Auinger | 310/198 |
| 5,424,599 | A | * | 6/1995 | Stroud | 310/198 |
| 5,486,731 | A | * | 1/1996 | Masaki et al. | 310/180 |
| 5,654,602 | A | * | 8/1997 | Willyoung | 310/179 |
| 6,388,357 | B1 | | 5/2002 | Tokumasu et al. | |
| RE38,464 | E | | 3/2004 | Kusase et al. | |
| 6,710,495 | B2 | * | 3/2004 | Lipo et al. | 310/184 |
| 6,864,667 | B2 | * | 3/2005 | Buening et al. | 322/90 |
| 6,894,417 | B2 | * | 5/2005 | Cai et al. | 310/198 |
| 7,105,973 | B2 | | 9/2006 | Brewster et al. | |
| 7,116,082 | B1 | * | 10/2006 | Baumgart | 322/45 |
| 7,348,705 | B2 | * | 3/2008 | Cai et al. | 310/184 |
| 7,388,311 | B2 | * | 6/2008 | Bhargava | 310/184 |
| 7,417,351 | B2 | * | 8/2008 | Mori et al. | 310/184 |
| 2002/0093266 | A1 | * | 7/2002 | Buening et al. | 310/198 |
| 2003/0085627 | A1 | * | 5/2003 | Lipo et al. | 310/12 |
| 2003/0214196 | A1 | * | 11/2003 | Cai et al. | 310/208 |
| 2004/0007932 | A1 | * | 1/2004 | Hyun | 310/184 |
| 2005/0012479 | A1 | * | 1/2005 | Wolf et al. | 318/254 |
| 2005/0206263 | A1 | * | 9/2005 | Cai et al. | 310/198 |
| 2006/0208595 | A1 | | 9/2006 | Bradfield | |
| 2007/0018525 | A1 | * | 1/2007 | Cai et al. | 310/184 |
| 2010/0013342 | A1 | * | 1/2010 | Xu et al. | 310/198 |

OTHER PUBLICATIONS

Wikipedia, "magnetomotive force", www.wikipedia.com, Apr. 2011.*

* cited by examiner

*Primary Examiner* — John K Kim
(74) *Attorney, Agent, or Firm* — Miriam Jackson, Esq.

(57) ABSTRACT

An electrical motor or generator asymmetrical armature winding configuration generating a multi-phase balanced power output. Each winding group for each pole, and the conductors constituting each winding group, are chosen individually according to their magnetomotive force (MMF) vector relationship to provide a balanced power output even though the individual windings may not be balanced or symmetrical.

18 Claims, 20 Drawing Sheets phase A

FIG. 2B

Phase B

FIG. 3B

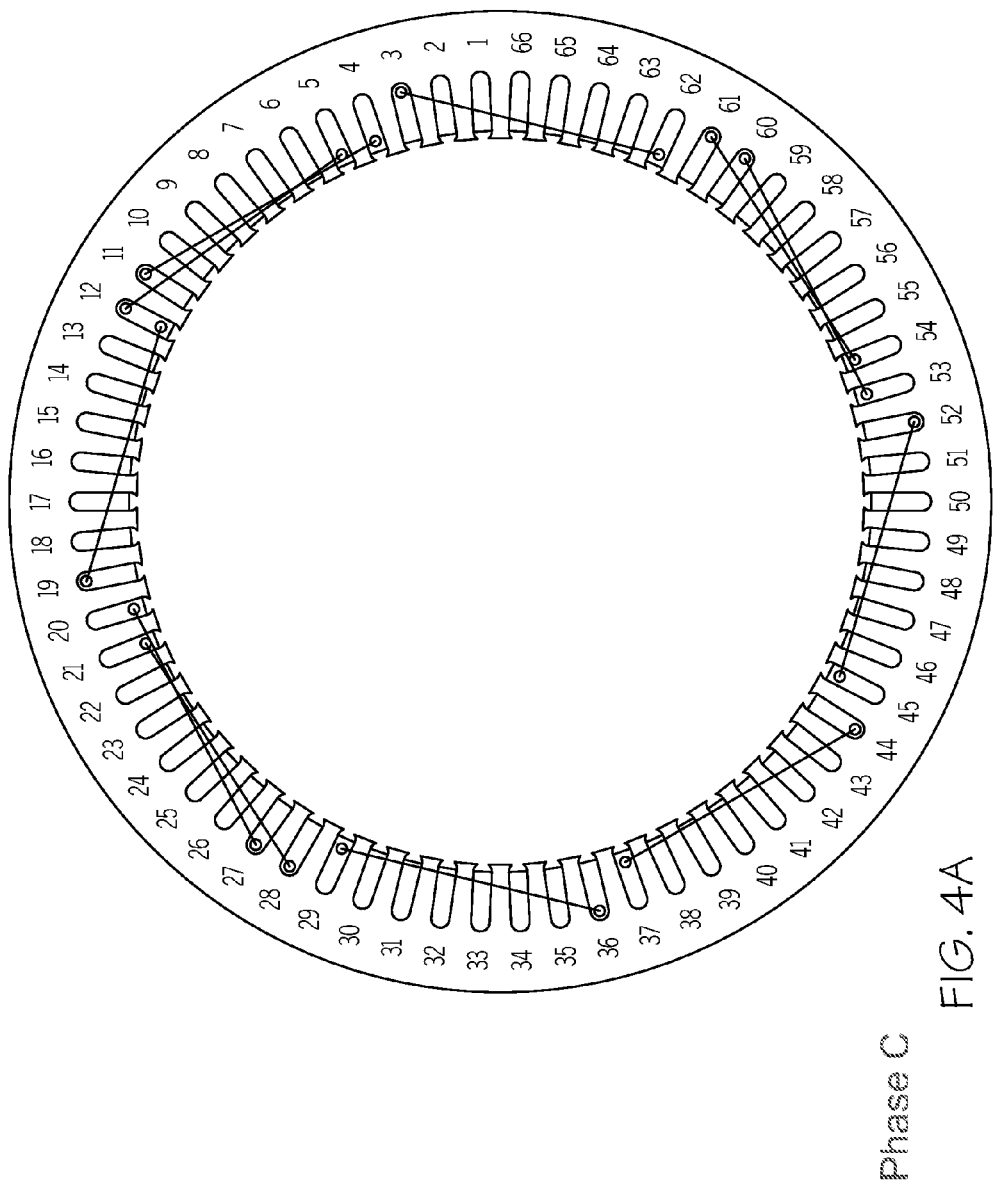
Phase C  FIG. 4A

Phase a

FIG. 5B

Phase b

FIG. 6B

Phase c

FIG. 7B

OPTIMIZED MULTI-PHASE ARMATURE WINDING

BACKGROUND OF THE INVENTION

The present invention generally relates to apparatus for designing large electrical machines such as megawatt machines, and, more specifically, to an apparatus using a multi-phase winding.

When designing large electrical machines, such as megawatt machines, it is sometimes desirable to use a multi-phase arrangement to increase efficiency and reduce weight. For example, a 6-phase winding may consist of two 3-phase windings that have 30 electrical degree phase shift relative to each other. A significant drawback to this approach is that there is a limited number of slot number/pole number combinations that can be used. The available numbers are often widely spaced, for example; for an 8-pole electrical machine, the first available number of slots is 48, and the next is 96. If this number of available slots is incompatible with the overall design optimization, no numbers of slots can be selected in between the range 48 to 96, therefore missing a design "sweet spot". Similar restrictions apply with other pole numbers, including 4-pole and 6-pole.

FIG. 1A through FIG. 1C show a conventional, balanced, symmetrical armature winding configuration under the prior art. FIG. 1A is diagram of the wiring arrangement for a 3-phase implementation under the prior art. The three windings beginning and ending are respectively identified as U1 to U2, W1 to W2, and V1 to V2. Slot numbers are identified from 1 to 36, for a total of 36 slots.

FIG. 1B shows a developed winding diagram for the first phase of the three phase circular windings shown in FIG. 1A if cut and laid out from end-to-end. FIG. 1C is a table laying out the winding pattern for the first phase going from U1 to U2. There are four coil groups in this phase and each coil group has three coils. There are two coil sides in each coil. The first coil has one side in slot 1 and the other in slot 8 (a span of 7); the second coil has one side in slot 2 and the other in slot 9; the third has one side in slot 3 and the other in slot 10. The second coil side of coil 1, which is in slot 8, is connected to the first coil side of coil 2, which is in slot 2; similarly the second coil side of coil 2, which is in slot 9, is connected to the first coil side of coil 3, which is in slot 3. In this fashion all these coils are connected in series to form the first clockwise positive polarity coil group. If current flows into the first coil side of coil 1 which is placed in slot 1, then the current would flow as indicated by the arrows according to the following sequence: from slot 1 to slot 8, from slot 8 to slot 2, from slot 2 to slot 9, from slot 9 to slot 3, and from slot 3 to slot 10. From slot 10, the wiring skips over to slot 19, then goes counter-clockwise from slot 19 to slot 12, slot 12 to slot 18, slot 18 to slot 11, slot 11 to slot 17, and slot 17 to slot 10, completing a first counterclockwise negative polarity winding run. In this coil group, within each coil the current flows from the second coil side to the first coil side which is opposite to the first coil group. The next two coil groups repeat the pattern of first two coil groups. From slot 10, the winding skips over to slot 19 to slot 26, slot 26 to slot 20, slot 20 to slot 27, slot 27 to slot 21, and slot 21 to slot 28, completing a second clockwise positive polarity winding run. From slot 28, the winding skips to slot 1 to slot 30, slot 30 to slot 36, slot 36 to slot 29, slot 29 to slot 35, and slot 35 to slot 28, completing a second counterclockwise winding run. This completes the first phase winding. The second phase W1 start begins at slot 7 and follows a similar winding pattern with W2 ending at slot 34. The third phase V1 start begins at slot 13 and follows a similar winding pattern with V2 ending at slot 4. The second phase W1-W2 is lagging the first phase U1-U2 by 120 electrical degrees, and the third phase V1-V2 is lagging the second phase W1-W2 by 120 electrical degrees.

SUMMARY OF THE INVENTION

In one aspect of the present invention, a multi phase generator armature winding, comprising an asymmetrical armature coil winding for each pole with the associated phase organized into multiple pole winding groups producing a symmetrical electrical output; and each phase of the multiple pole windings having an equal relative phase shift between the phases.

In another aspect of the present invention, a multi phase power generator armature winding, comprising a multi phase winding with at least two sets of phases of power output using asymmetrical coil windings.

In a further aspect of the present invention, a multi phase power generator, comprising a generator having an asymmetrical coil configuration producing a balanced multi phase power output; each coil configuration organized as part of a winding group using conductors having an electrical degree relative phase shift between phases; and a vector sum for each winding group for each pole varying but the resultant magnitude of each phase and resultant phase angle between each phase is equal.

These and other features, aspects, and advantages of the present invention will become better understood with reference to the following drawings, description, and claims.

BRIEF DESCRIPTION OF THE DRAWINGS

FIG. 2B is a table that sets forth one possible embodiment for the basic winding pattern for the 6-phases in accordance with an embodiment of the present invention; the locations of each coil side together with their electrical degree shift are also shown;

FIG. 3B is a table that sets forth one possible embodiment for the basic winding pattern for the six phases in accordance with an embodiment of the present invention; the locations of each coil side together with their electrical degree shift are also shown;

FIG. 4A shows a winding schematic that can be used for the third phase, phase C, of a 6-phase winding design of an embodiment of the present invention;

FIG. 5B is a table that sets forth one possible embodiment for the basic winding pattern for the six phases in accordance with an embodiment of the present invention; the locations of each coil side together with their electrical degree shift are also shown;

FIG. 6B is a table that sets forth one possible embodiment for the basic winding pattern for the six phases in accordance with an embodiment of the present invention; the locations of each coil side together with their electrical degree shift are also shown;

FIG. 7B is a table that sets forth one possible embodiment for the basic winding pattern for the six phases in accordance with an embodiment of the present invention; the locations of each coil side together with their electrical degree shift are also shown.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The invention can be used in any conventional power application requiring a multi-phase armature winding. For example, the invention can be incorporated into a generator producing electrical power or a motor producing mechanical power.

The invention provides a significant weight advantage over a conventional prior art multi-phase winding design because of the flexibility to choose an optimized number of slots without compromising the output power quality. This is especially true when designing high power machines such as megawatt generators. The invention gives a well balanced multi-phase winding that can be realized using slot numbers that are not available in prior art designs due to the phase shift requirement between phases.

Figure 1A:
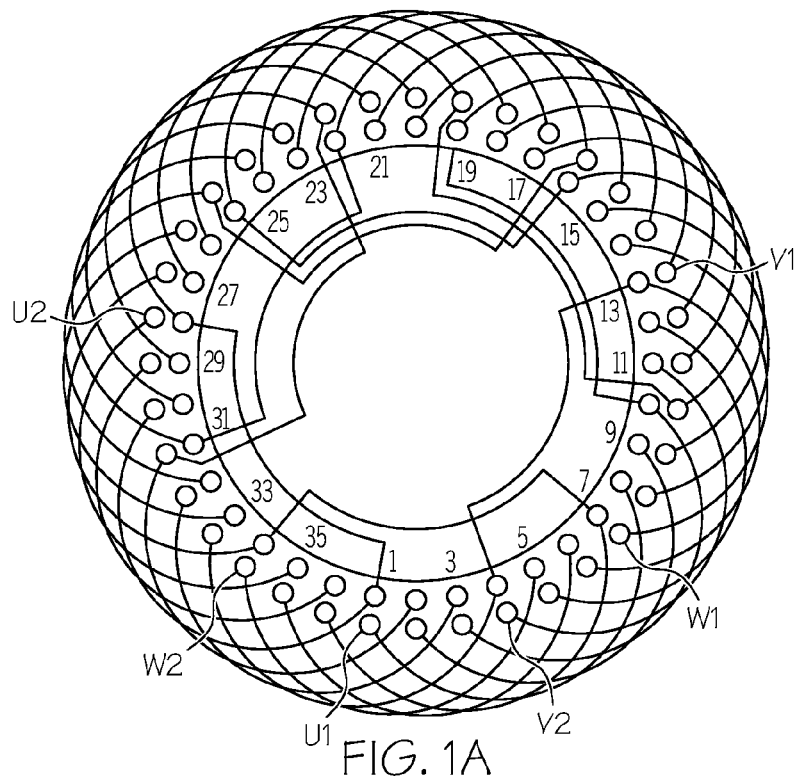
FIG. 1A is diagram of the wiring arrangement for a 3-phase implementation under the prior art.
Figure 1B:
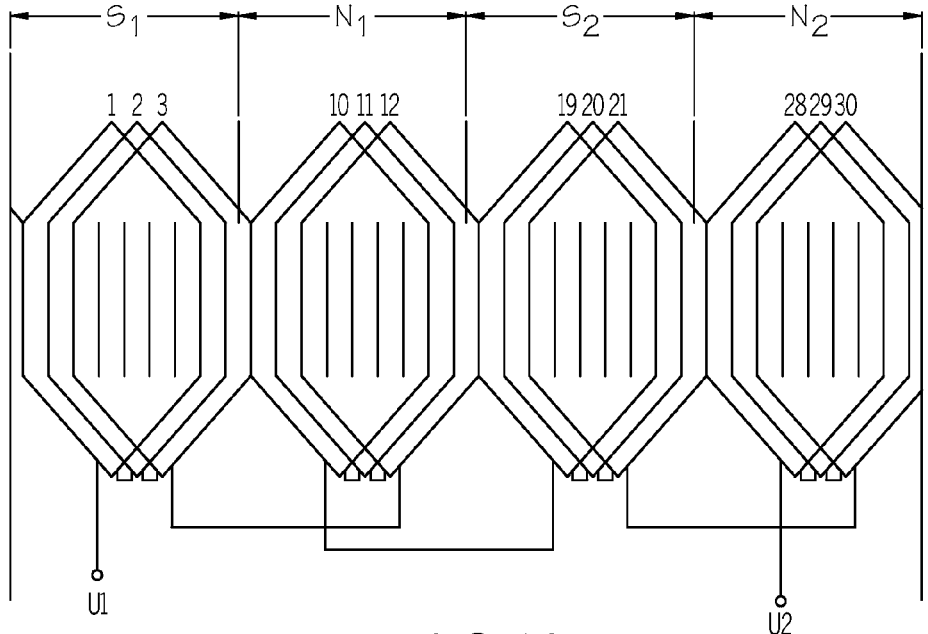
FIG. 1B is the developed winding diagram for the first phase of the circular windings for the 3-phase winding of FIG. 1A if cut and laid out from end-to-end.
Figure 1C:
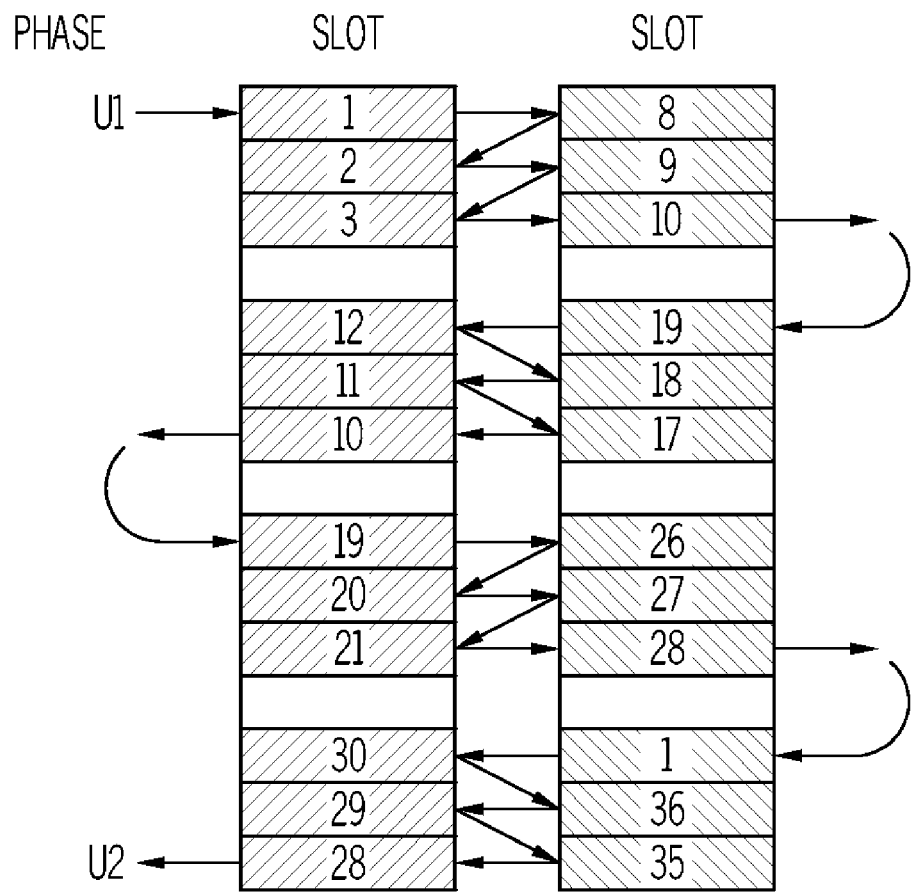
FIG. 1C is a table laying out the winding pattern for the first phase of FIG. 1A.

In a conventional multi-phase armature winding, each phase is identical, and within each phase there is the same number of uniform regular coils for each pole which are distributed symmetrically around the armature periphery. This conventional wiring requires symmetrical layout of identical regular coil groups with identical spacing between coil groups. For example; for a 4-pole 36 slots armature winding, as shown in FIG. 1B, the conventional configuration provides four coil groups with symmetrical windings for each of the three coils. Prior art design using this conventional symmetrical approach can limit flexibility and impose complexity and performance constraints.

The invention may facilitate using a number of slots and winding patterns that are not feasible in a conventional design. This invention may not constrain the windings to the conventional symmetrical layout of identical regular coil groups, but the target is still to achieve a well balanced multi-phase winding with equal phase displacement within each group of phase windings, and a desired electrical shift between different sets of phase windings.

In the invention, each winding group for each pole, and the conductors constituting each winding group, may be chosen individually according to their magnetomotive force (MMF) vector relationship with each other. The vector sum of each winding group for each pole can be different, but the vector sum of each phase may be identical. Also, the resultant phase angle between each winding group for each pole can be different, but the resultant phase angle between each phase may still be equal for each of the multi-phase windings and a desired phase shift between winding sets. The flexible arrangement of coils and conductors can achieve an improved winding utilization in addition to well balanced multi-phase windings. This new asymmetrical arrangement may permit using slot numbers unfeasible in a prior art conventional design. An example of an 8-pole, 66-slot, 6-phase winding design is shown in FIGS. 2A to 7C to demonstrate an exemplary embodiment of the invention.

Figure 2A:
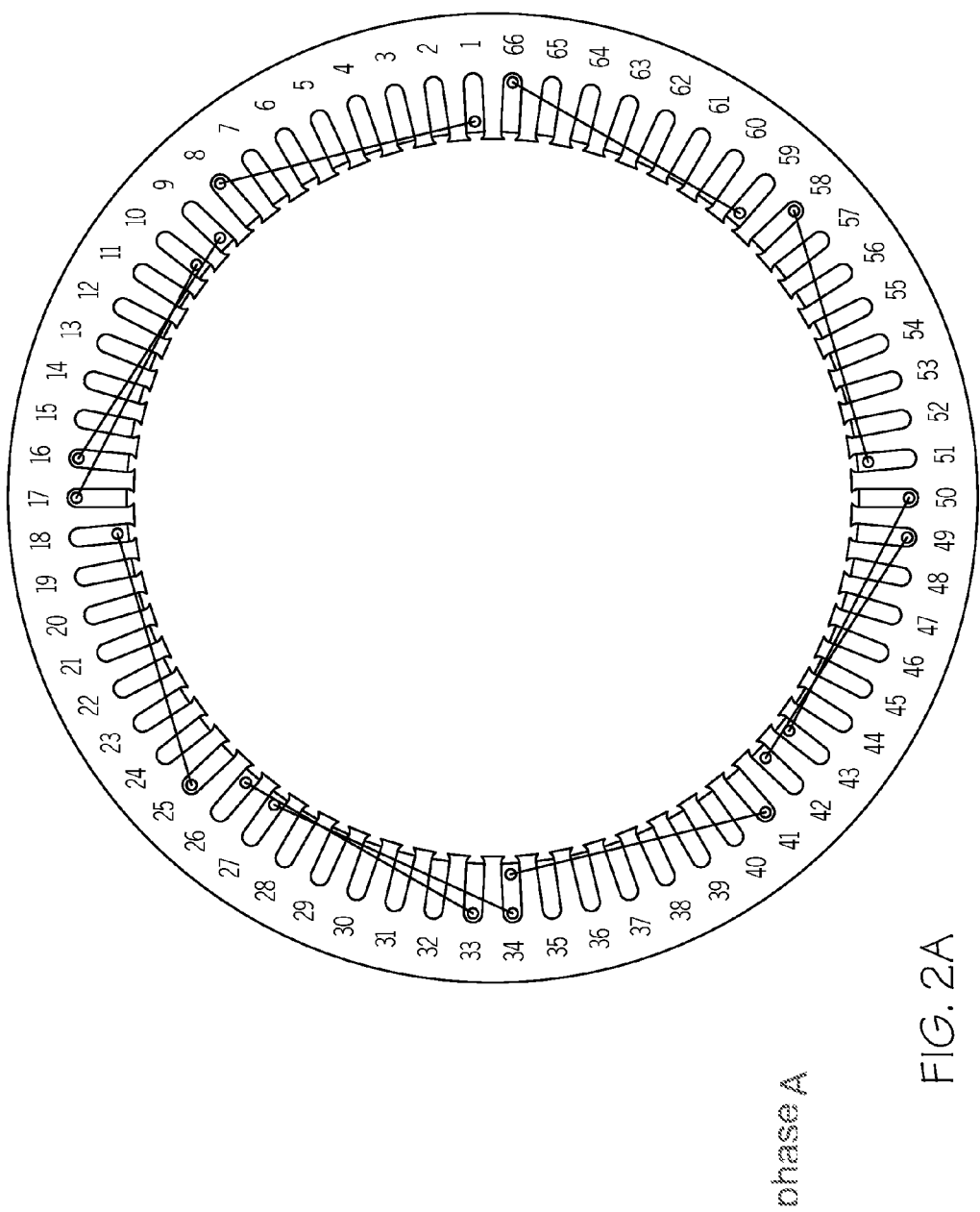
FIG. 2A shows a winding schematic that can be used for the first phase, phase A, of a 6-phase winding design of an embodiment of the present invention.
Figure 2B:
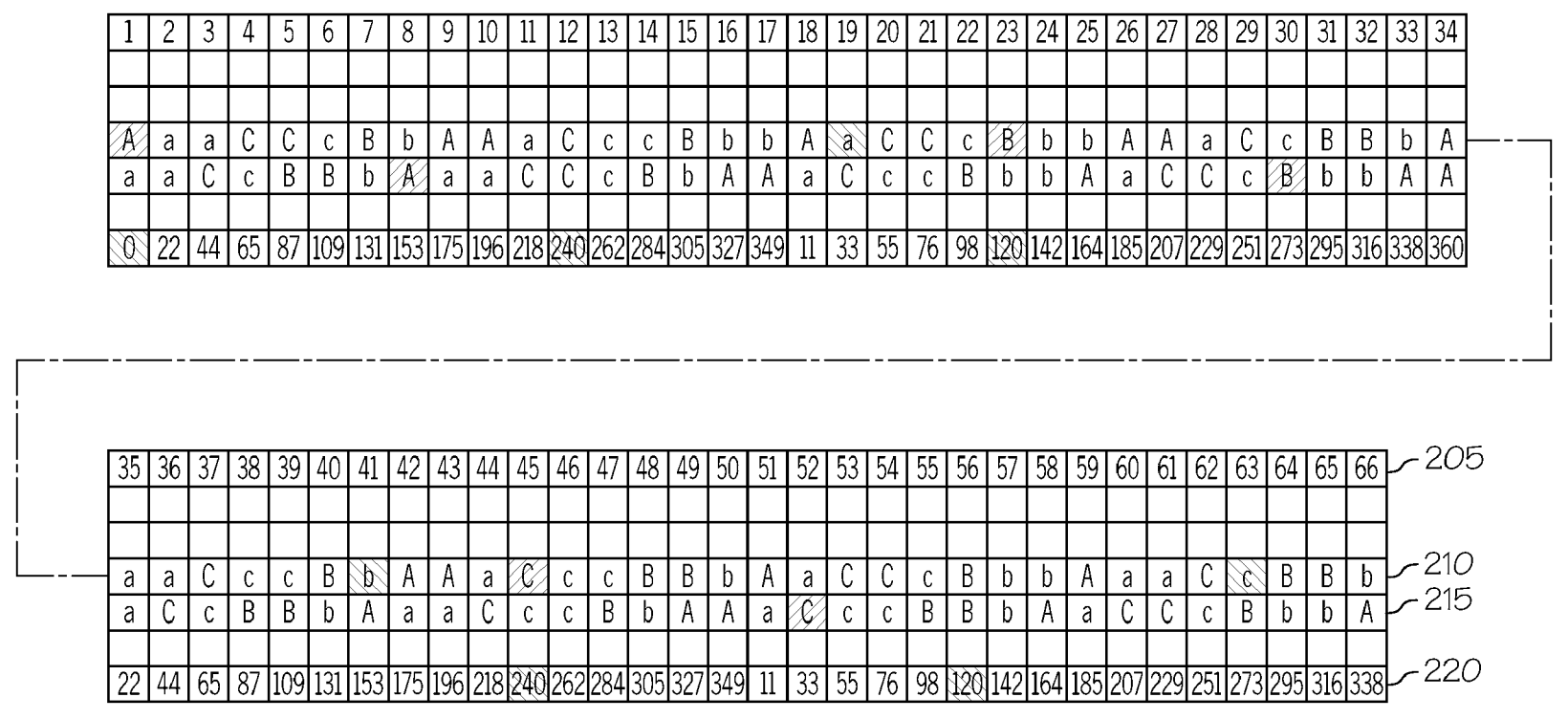

FIG. 2A shows a winding schematic that can be used for the first phase, phase A of a 6-phase winding design, with the first through sixth phases designated by A, B, C, a, b, and c respectively. FIG. 2B is a table that sets forth one possible embodiment for the basic winding pattern for the six phases. The first row 205 shows the slot numbers (e.g. 1-66). The second row 210 shows an exemplary embodiment for the conductors near the slot openings with a capital letter (e.g. A-C) showing the first three phases and lower case for the second three phases (e.g. a-c). The third row 215 shows the conductors of the exemplary embodiment near the slot bottoms with a capital letter showing the first three phases and lower case for the second three phases. The fourth row 220 shows the corresponding electrical degrees for each slot with zero degree placed at slot number 1.

The first 3-phase winding is shown as A, B, and C. Phase A can start at slot 1, Phase B can start at slot 23, and Phase C can start at slot 45. The second 3-phase winding is shown as a, b, and c. Phase a can start at slot 19, Phase b can start at slot 41, and Phase c can start at slot 63.

Figure 2C:
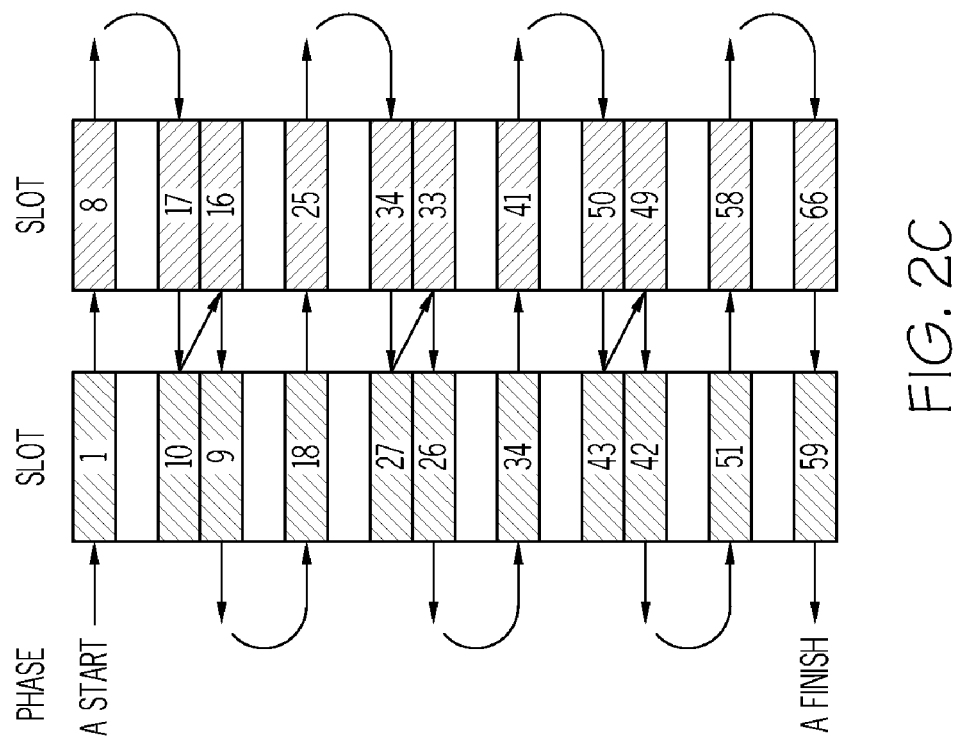
FIG. 2C shows the conductor connection sequence for Phase A of the 6-phase winding and the other two phases can follow a similar pattern in accordance with an embodiment of the present invention.

FIG. 2C shows the conductor connection sequence for Phase A and phases B and C can follow a similar pattern. The winding pattern can begin at slot 1 to 8 (e.g. a span of 7) completing a first coil group. Two series connected coils from slot 17 to slot 10, and from slot 16 to slot 9, can complete a second coil group. A single coil from slot 18 to slot 25 can complete a third coil group. Two series connected coils from slot 34 to slot 27 and from slot 33 to slot 26 can complete a fourth coil group. Coils from slot 34 to slot 41 can complete a fifth coil group. Two series connected coils from slot 50 to slot 43 and from slot 49 to slot 42 can complete a sixth coil group. A single coil from slot 51 to slot 58 can compete a seventh coil group, and another single coil from slot 66 to slot 59 can complete a final eighth coil group.

Figure 3A:
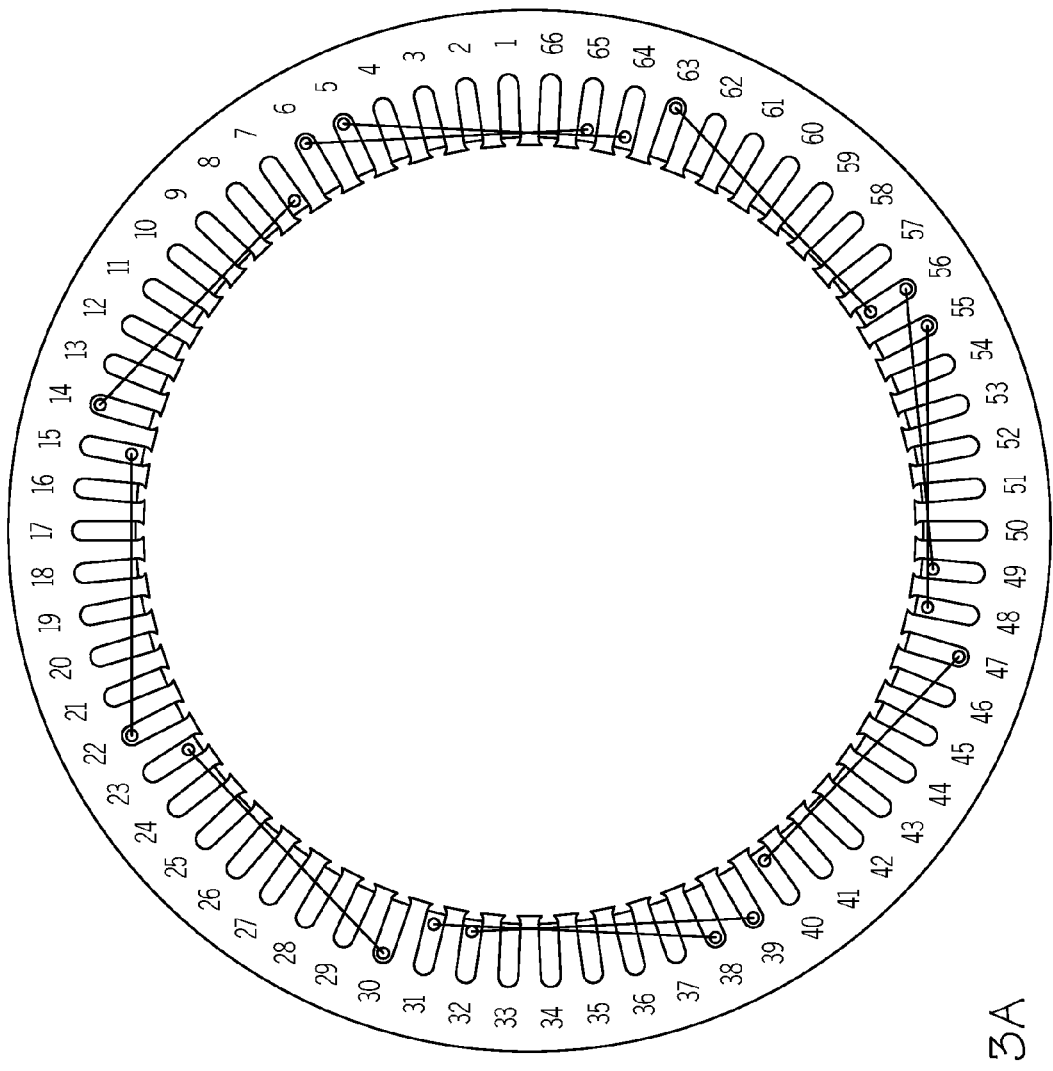
FIG. 3A shows a winding schematic that can be used for the second phase, phase B, of a 6-phase winding design of an embodiment of the present invention.
Figure 3B:
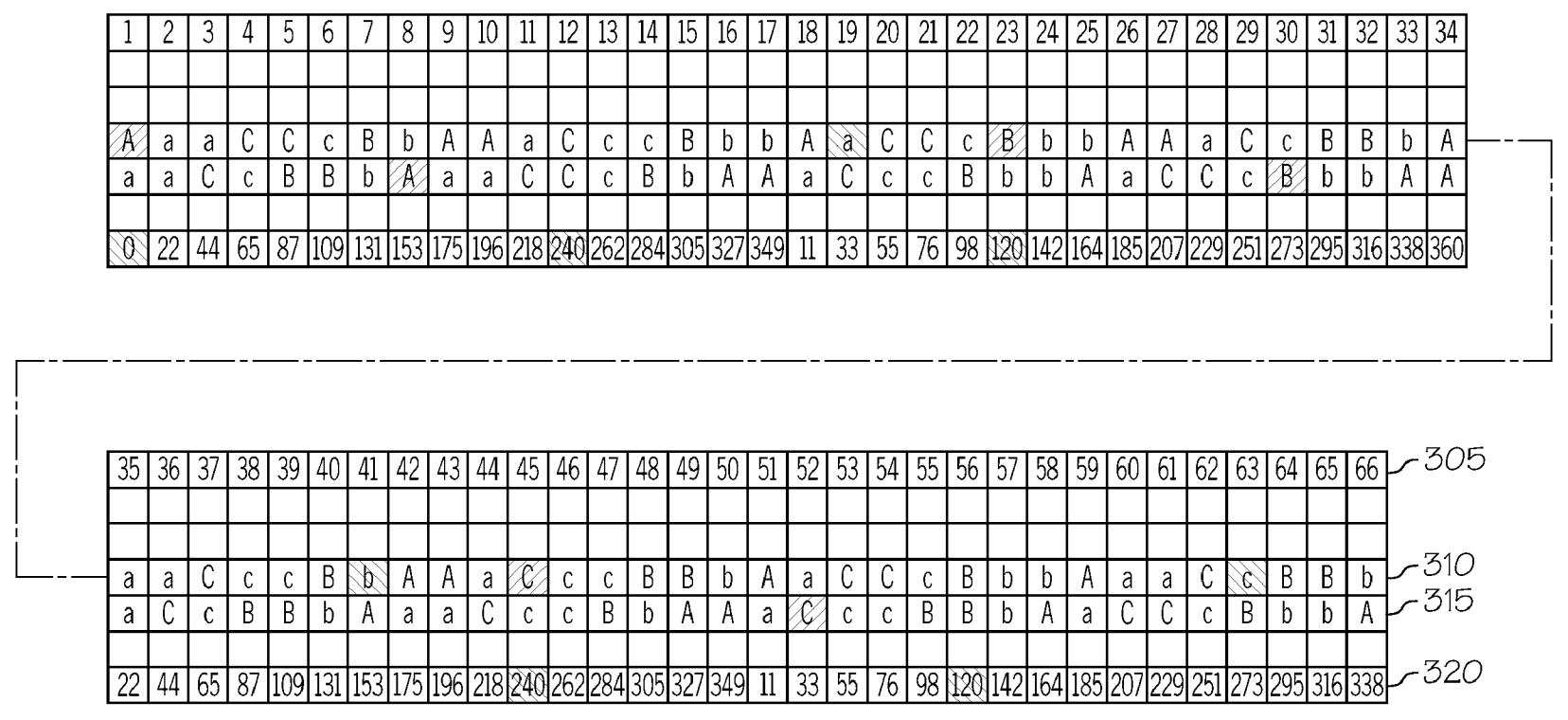

FIG. 3A shows a winding schematic that can be used for the second Phase B of a 6-phase winding design, with the first through sixth phases designated by A, B, C, a, b, and c respectively. FIG. 3B is a table that sets forth one possible embodiment for the basic winding pattern for the six phases. The first row 305 shows the slot numbers (e.g. 1-66). The second row 310 shows an exemplary embodiment for the conductors near the slot openings with a capital letter (e.g. A-C) showing the first three phases and lower case for the second three phases (e.g. a-c). The third row 315 shows the conductors of the exemplary embodiment near the slot bottoms with a capital letter showing the first three phases and lower case for the second three phases. The fourth row 320 shows the corresponding electrical degrees for each slot with zero degree placed at slot number 1.

The first 3-phase winding is shown as A, B, and C. Phase A can start at slot 1, Phase B can start at slot 23, and Phase C can start at slot 45. The second 3-phase winding is shown as a, b, and c. Phase a can start at slot 19, Phase b can start at slot 41, and Phase c can start at slot 63.

Figure 3C:
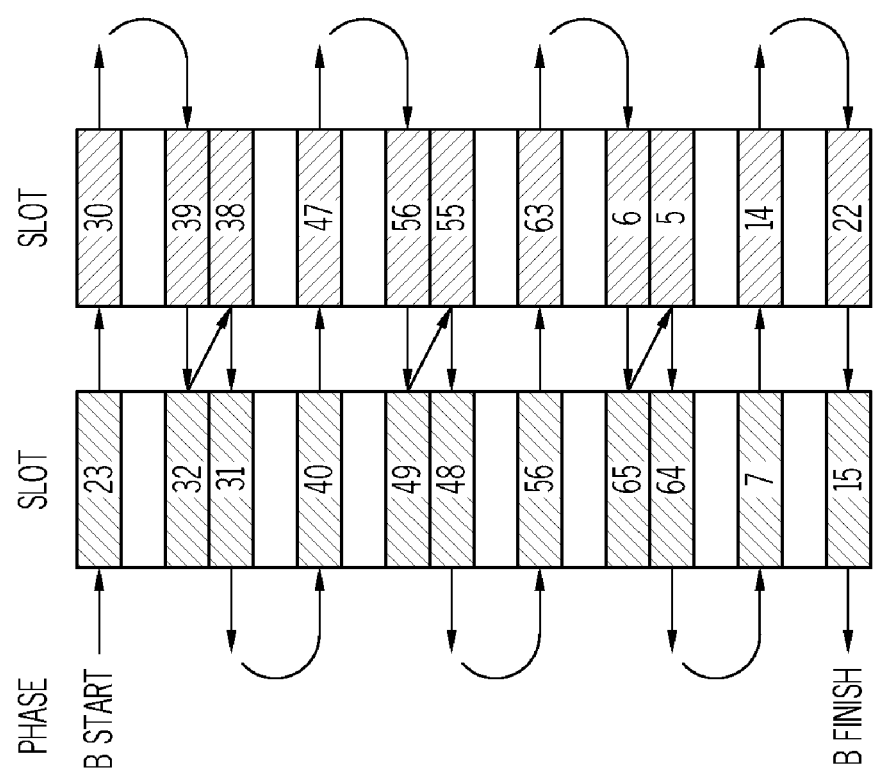
FIG. 3C shows the conductor connection sequence for Phase B of the 6-phase winding and shows a similar pattern to Phase A in accordance with an embodiment of the present invention.

FIG. 3C shows the conductor connection sequence for Phase B with a similar pattern to Phase A. The winding pattern can begin at slot 23 to 30 (e.g. a span of 7) completing a first coil group. Two series connected coils from slot 39 to slot 32 and from slot 38 to slot 31 can complete a second coil group. A single coil from slot 40 to slot 47 can complete a third coil group. Two series connected coils from slot 56 to slot 49 and from slot 55 to slot 48 can complete a fourth coil group. A single coil from slot 56 to slot 63 can complete a fifth coil group. Two series connected coils from slot 6 to slot 65 and from slot 5 to slot 64 can complete a sixth coil group. A single coil from slot 7 to slot 14 can compete a seventh coil group, and another single coil from slot 22 to slot 15 can complete a final eighth coil group.

Figure 4B:
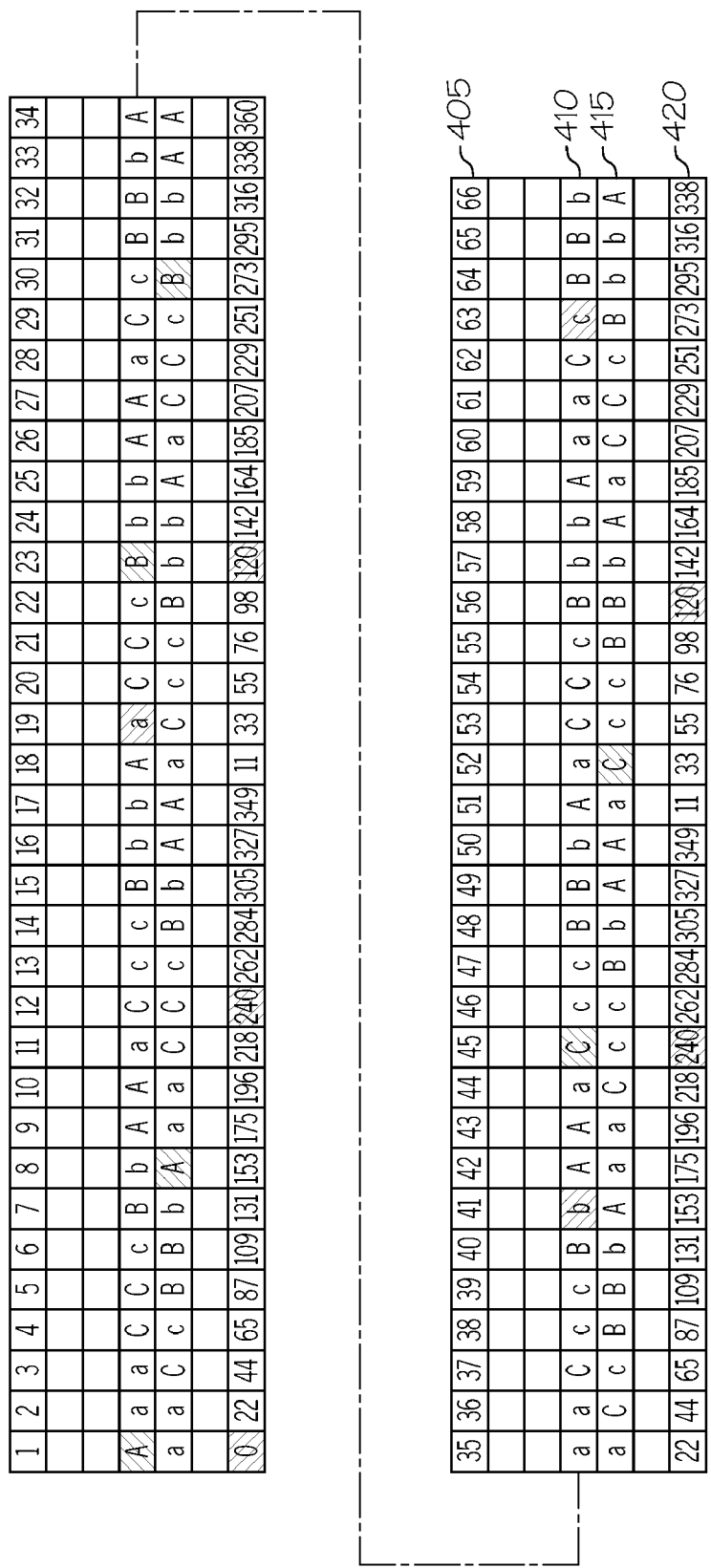
FIG. 4B is a table that sets forth one possible embodiment for the basic winding pattern for the six phases in accordance with an embodiment of the present invention; the locations of each coil side together with their electrical degree shift are also shown.

FIG. 4A shows a winding schematic that can be used for the third phase C of a 6-phase winding design, with the six phases designated by A, B, C, a, b, and c respectively. FIG. 4B is a table that sets forth one possible embodiment for the basic winding pattern for the six phases. The first row 405 shows the slot numbers (e.g. 1-66). The second row 410 shows an exemplary embodiment for the conductors near the slot openings with a capital letter (e.g. A-C) showing the first three phases and lower case for the second three phases (e.g. a-c). The third row 415 shows the conductors of the exemplary embodiment near the slot bottoms with a capital letter showing the first three phases and lower case for the second three phases. The fourth row 420 shows the corresponding electrical degrees for each slot with zero degree placed at slot number 1.

The first 3-phase winding is shown as A, B, and C. Phase A can start at slot 1, Phase B can start at slot 23, and Phase C can start at slot 45. The second 3-phase winding is shown as a, b, and c. Phase a can start at slot 19, Phase b can start at slot 41, and Phase c can start at slot 63.

Figure 4C:
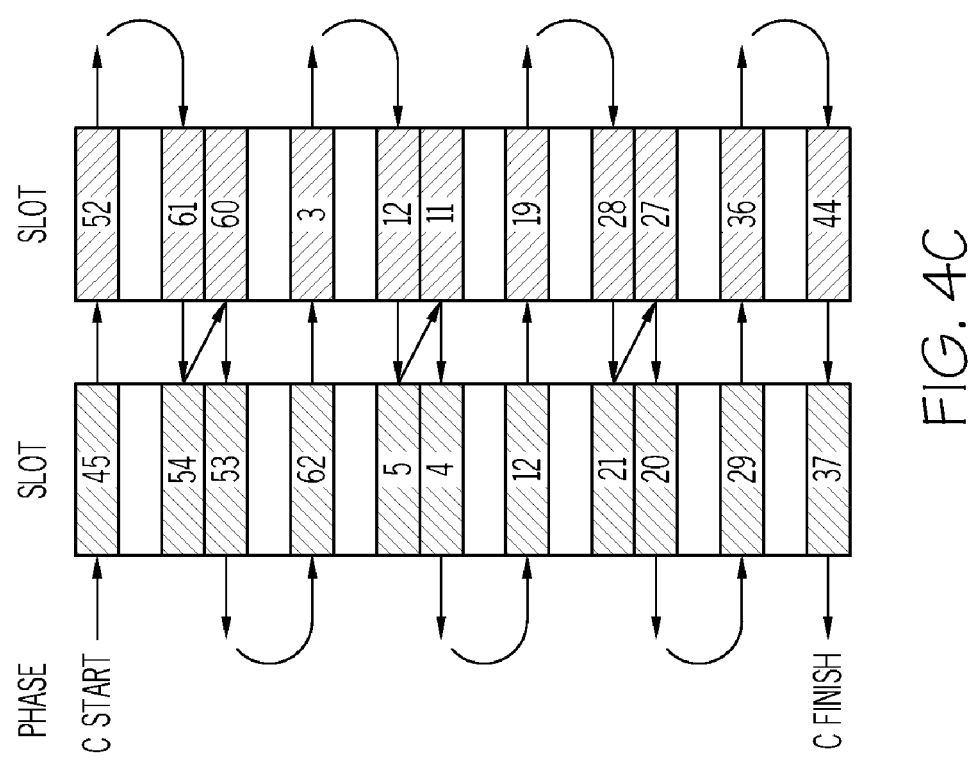
FIG. 4C shows the conductor connection sequence for Phase C of the 6-phase winding and shows a similar pattern to Phase A in accordance with an embodiment of the present invention.

FIG. 4C shows the conductor connection sequence for Phase C with a similar pattern to Phase A. The winding pattern can begin at slot 45 to 52 (e.g. a span of 7) completing a first coil group. Two series connected coils from slot 61 to slot 54 and from slot 60 to slot 53 can complete a second coil group. A single coil from slot 62 to slot 3 can complete a third coil group. Two series connected coils from slot 12 to slot 5 and from slot 11 to slot 4 can complete a fourth coil group. A single coil from slot 12 to slot 19 can complete a fifth coil group. Two series connected coils from slot 28 to slot 21 and from slot 27 to slot 20 can complete a sixth coil group. A single coil from slot 29 to slot 36 can compete a seventh coil group, and another single coil from slot 44 to slot 37 can complete a final eighth coil group.

Figure 5A:
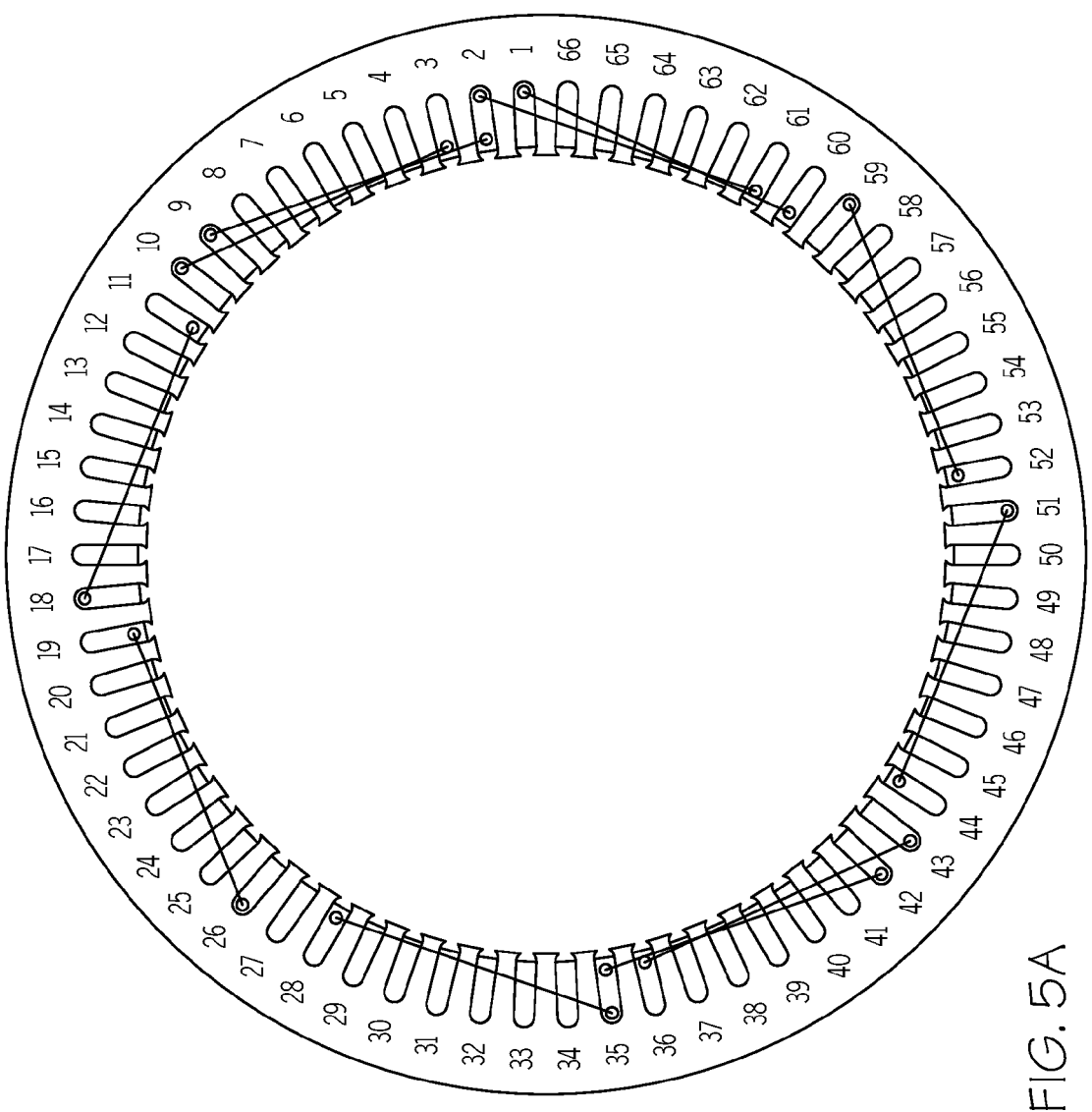
FIG. 5A shows a winding schematic that can be used for the fourth phase, phase a, of a 6-phase winding design of an embodiment of the present invention.

FIG. 5A shows a winding schematic that can be used for the fourth phase a of a 6-phase winding design, with the first through sixth phases designated by A, B, C, a, b, and c respectively. FIG. 5B is a table that sets forth one possible embodiment for the basic winding pattern for the six phases. The first row 505 shows the slot numbers (e.g. 1-66). The second row 510 shows an exemplary embodiment for the conductors near the slot openings with a capital letter (e.g. A-C) showing the first three phases and lower case for the second three phases (e.g. a-c). The third row 515 shows the conductors of the exemplary embodiment near the slot bottoms with a capital letter showing the first three phases and lower case for the second three phases. The fourth row 520 shows the corresponding electrical degrees for each slot with zero degree placed at slot number 1.

The first 3-phase winding is shown as A, B, and C. Phase A can start at slot 1, Phase B can start at slot 23, and Phase C can start at slot 45. The second 3-phase winding is shown as a, b, and c. Phase a can start at slot 19, Phase b can start at slot 41, and Phase c can start at slot 63.

Figure 5C:
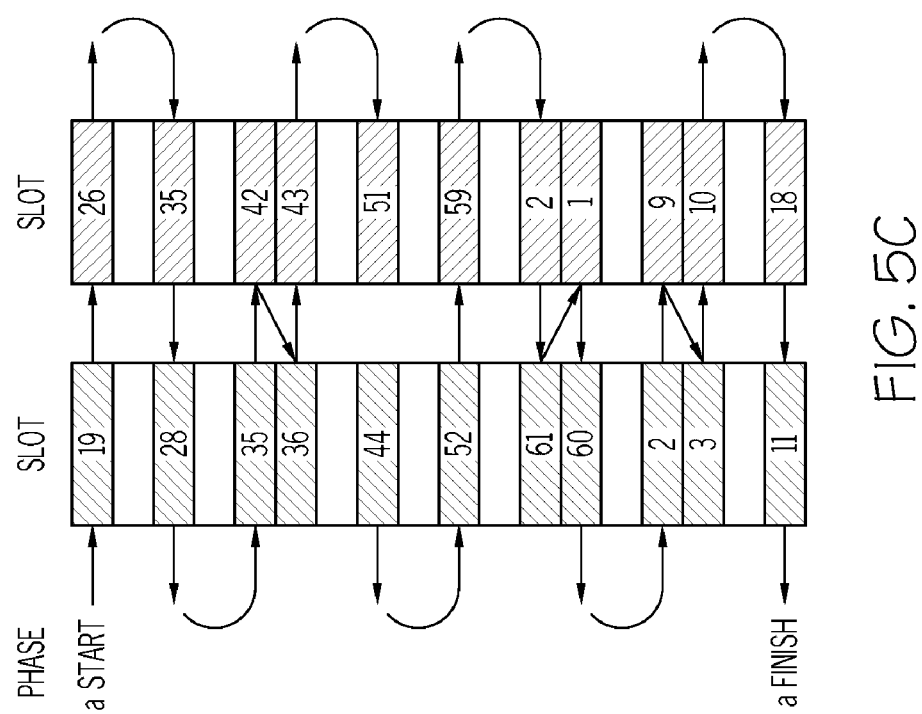
FIG. 5C shows the conductor connection sequence for Phase a of the 6-phase winding and the two following phases can follow a similar pattern in accordance with an embodiment of the present invention.

FIG. 5C shows the conductor connection sequence for Phase a, and Phases b and c can follow a similar pattern. The winding pattern can begin at slot 19 to 26 (e.g. a span of 7) completing a first coil group. A single coil from slot 35 to slot 28 can complete a second coil group. Two series connected coils from slot 35 to slot 42 and from slot 36 to slot 43 can complete a third coil group. A single coil from slot 51 to slot 44 can complete a fourth coil group. Another single coil from slot 52 to slot 59 can complete a fifth coil group. Two series connected coils from slot 2 to slot 61 and from slot 1 to slot 60 can complete a sixth coil group. Two series connected coils from slot 2 to slot 9 and from slot 3 to slot 10 can compete a seventh coil group, and a single coil from slot 18 to slot 11 can complete a final eighth coil group.

Figure 6A:
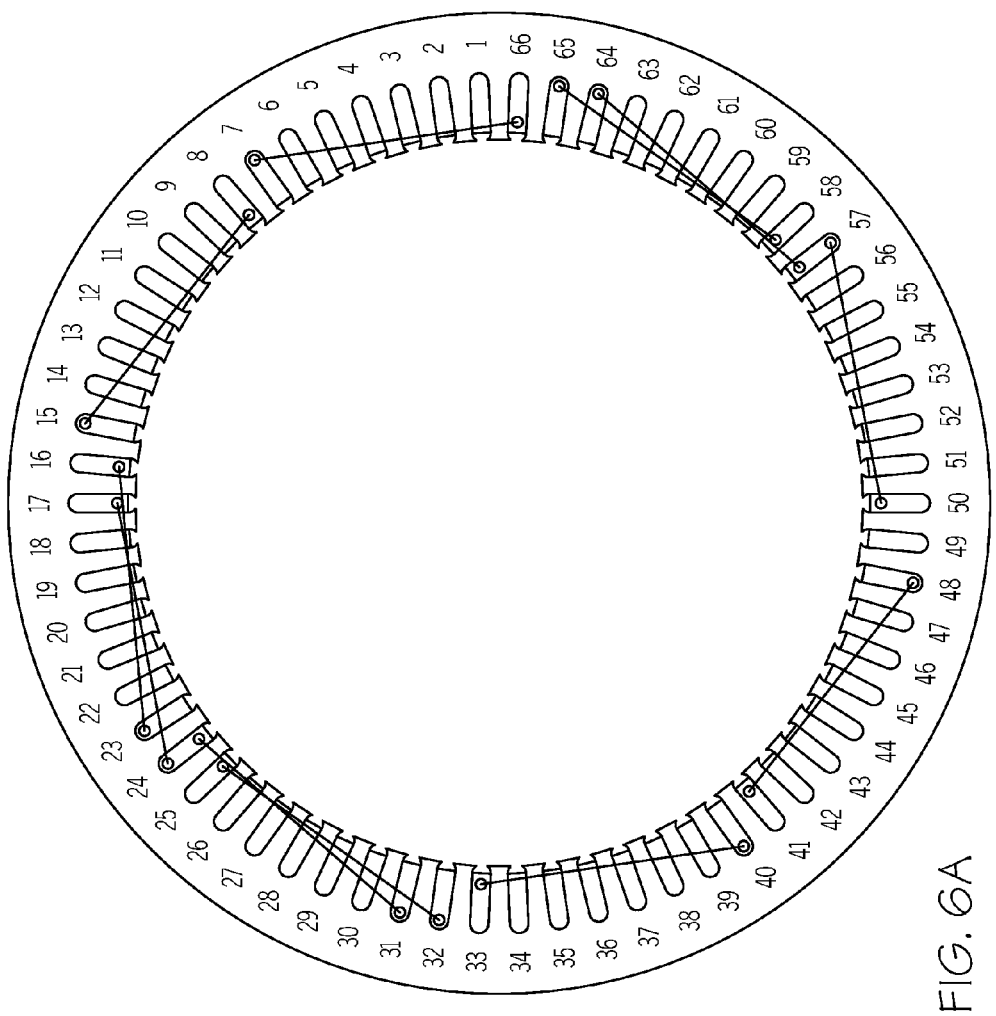
FIG. 6A shows a winding schematic that can be used for the fifth phase, phase b, of a 6-phase winding design of an embodiment of the present invention.
Figure 6B:
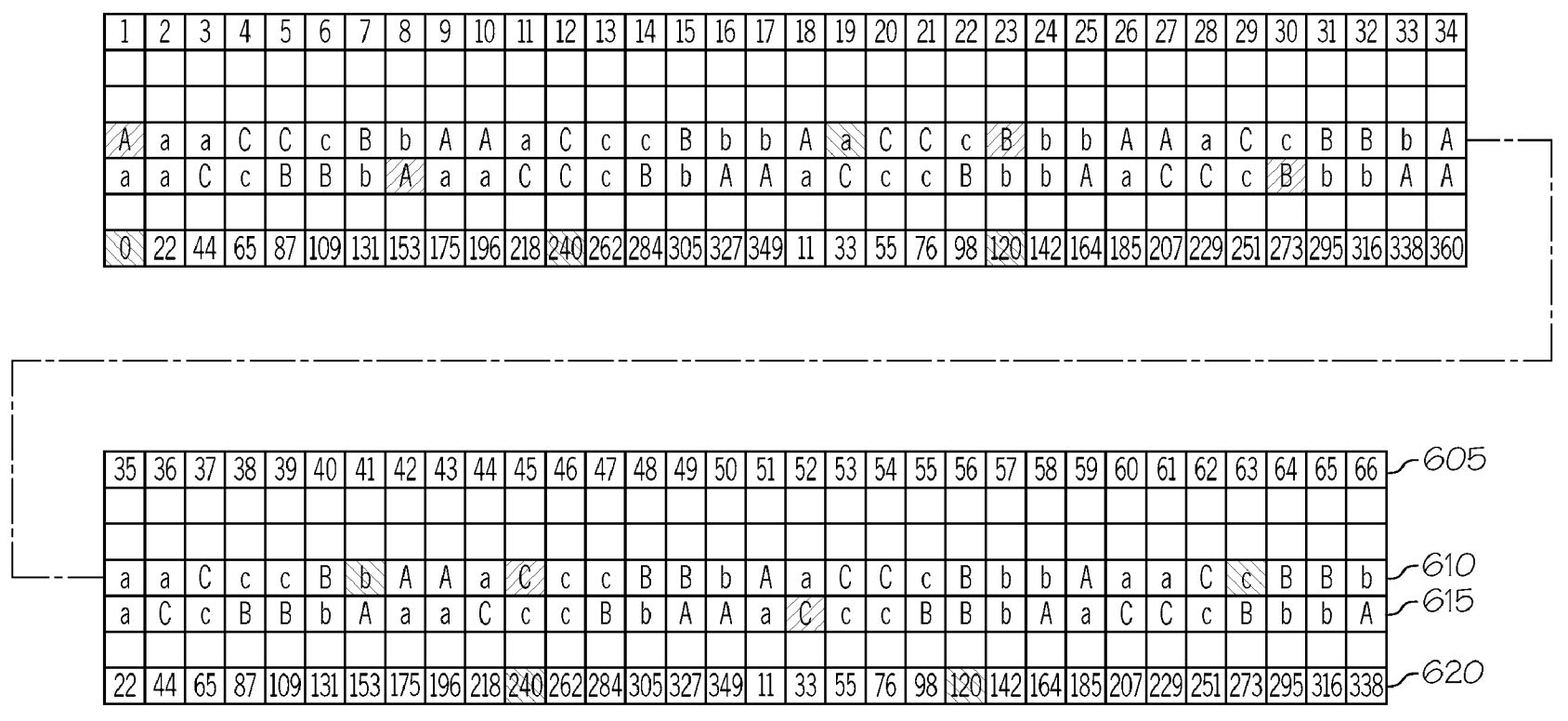

FIG. 6A shows a winding schematic that can be used for the fifth phase b of a 6-phase winding design, with the first through sixth phases designated by A, B, C, a, b, and c respectively. FIG. 6B is a table that sets forth one possible embodiment for the basic winding pattern for the six phases. The first row 605 shows the slot numbers (e.g. 1-66). The second row 610 shows an exemplary embodiment for the conductors near the slot openings with a capital letter (e.g. A-C) showing the first three phases and lower case for the second three phases (e.g. a-c). The third row 615 shows the conductors of the exemplary embodiment near the slot bottoms with a capital letter showing the first three phases and lower case for the second three phases. The fourth row 620 shows the corresponding electrical degrees for each slot with zero degree placed at slot number 1.

The first 3-phase winding is shown as A, B, and C. Phase A can start at slot 1, Phase B can start at slot 23, and Phase C can start at slot 45. The second 3-phase winding is shown as a, b, and c. Phase a can start at slot 19, Phase b can start at slot 41, and Phase c can start at slot 63.

Figure 6C:
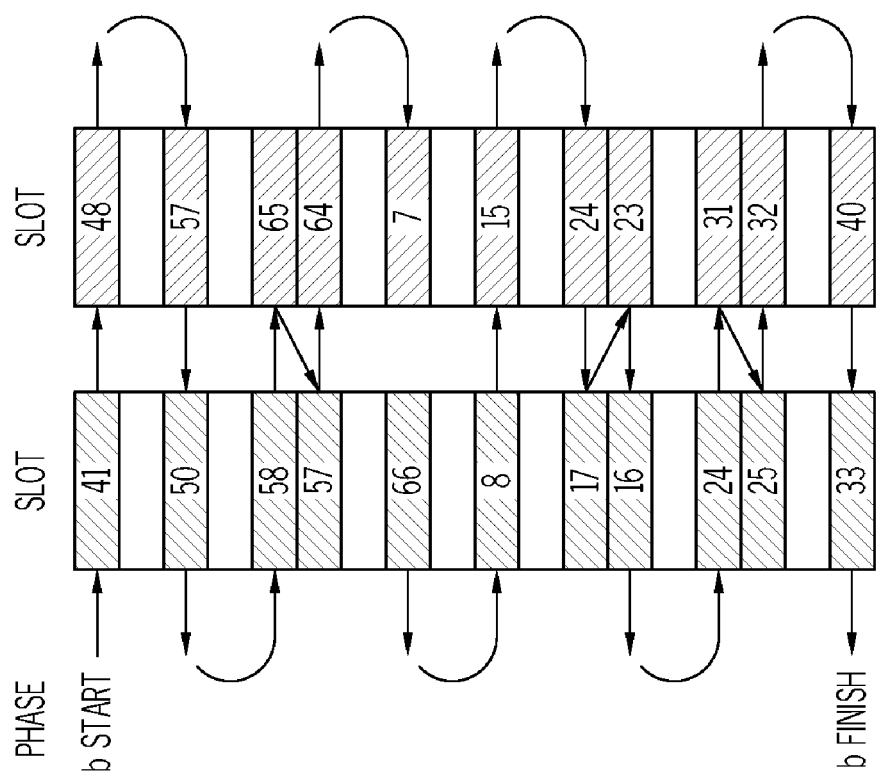
FIG. 6C shows the conductor connection sequence for Phase b of the 6-phase winding and shows a similar pattern to Phase a in accordance with an embodiment of the present invention.

FIG. 6C shows the conductor connection sequence for Phase b with a similar pattern to Phase a. The winding pattern can begin at slot 41 to 48 (e.g. a span of 7) completing a first coil group. Another single coil from slot 57 to slot 50 can complete a second coil group. Two series connected coils from slot 58 to slot 65 and from slot 57 to slot 64 can complete a third coil group. A single coil from slot 7 to slot 66 can complete a fourth coil group. Another single coil from slot 8 to slot 15 can complete a fifth coil group. Two series connected coils from slot 24 to slot 17 and from slot 23 to slot 16 can complete a sixth coil group. Two series connected coils from slot 24 to slot 31 and from slot 25 to slot 32 can compete a seventh coil group, and a single coil from slot 40 to slot 33 can complete a final eighth coil group.

Figure 7A:
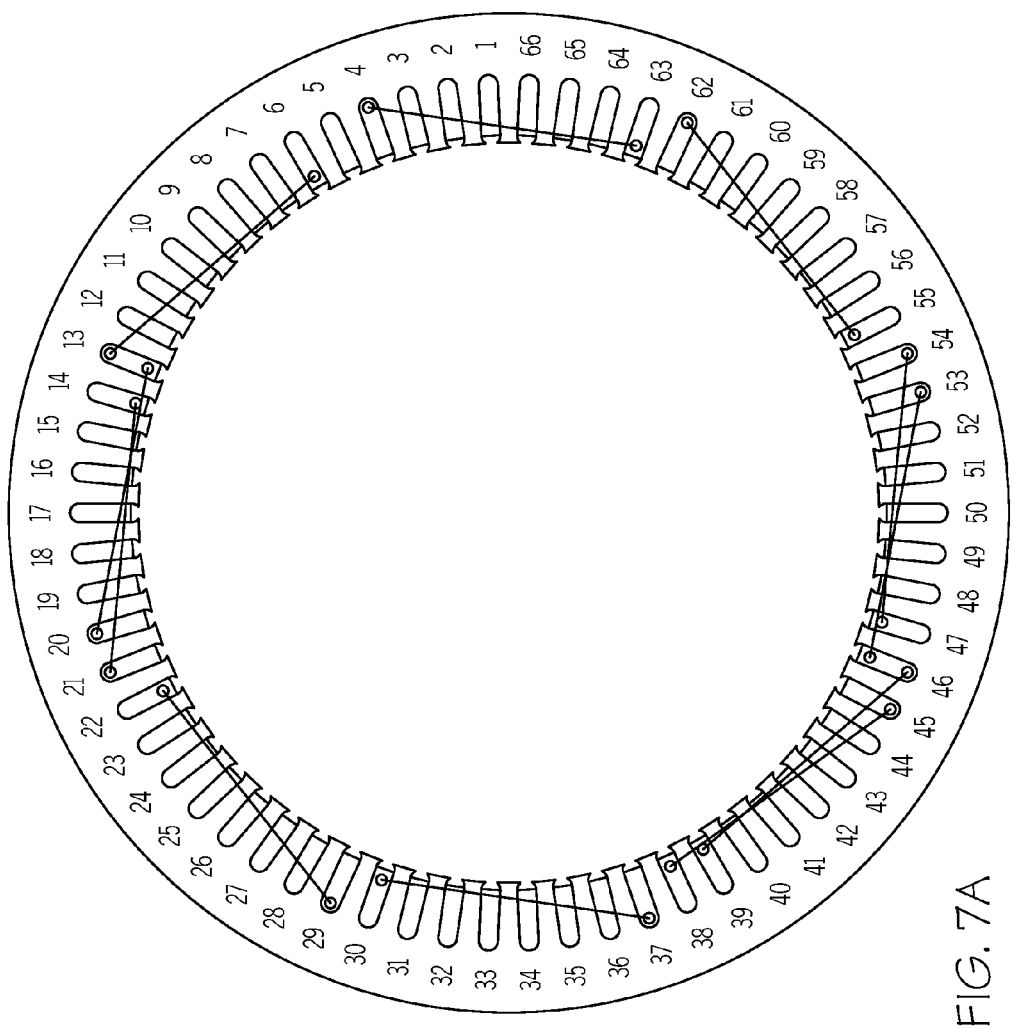
FIG. 7A shows a winding schematic that can be used for the sixth phase, phase c, of a 6-phase winding design of an embodiment of the present invention.
Figure 7B:
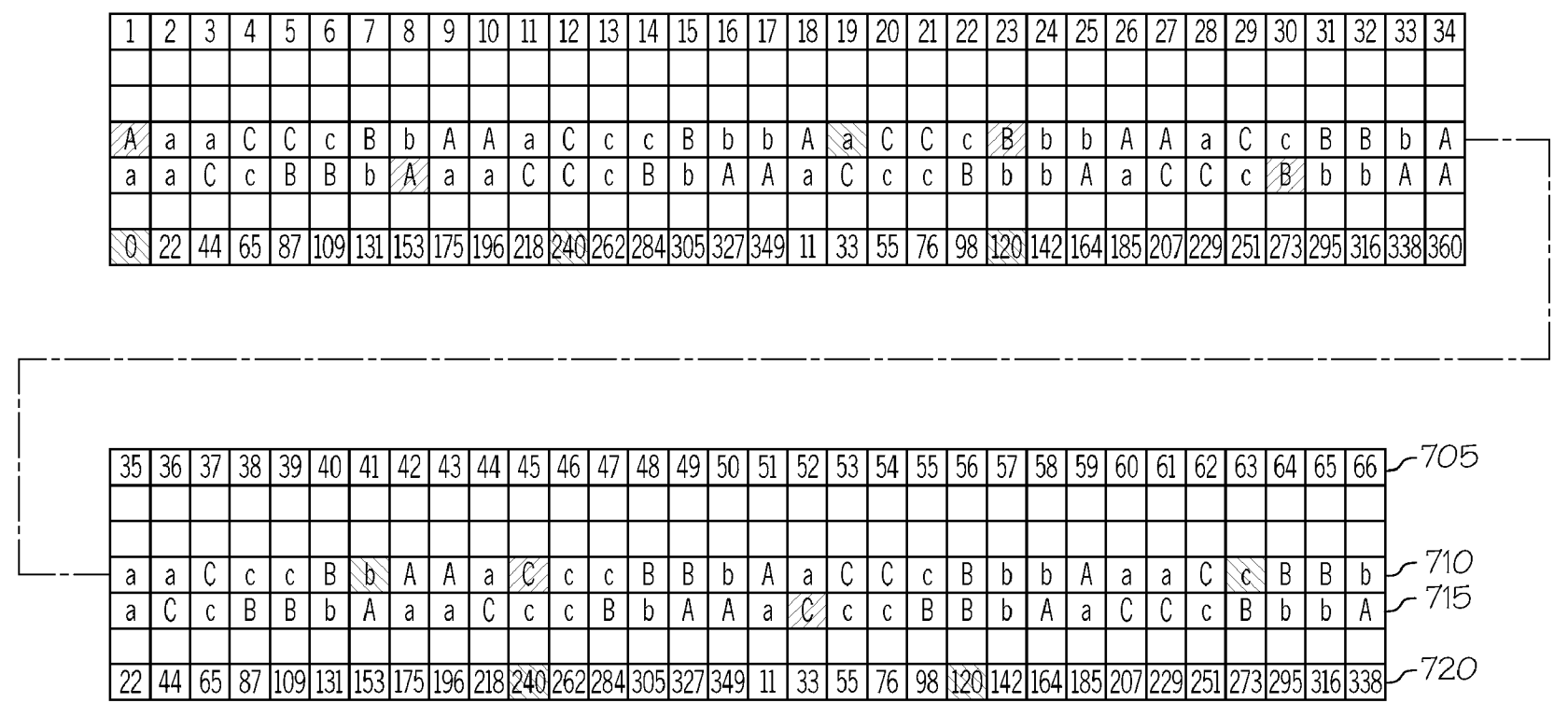

FIG. 7A shows a winding schematic that can be used for the sixth phase c of a 6-phase winding design, with the first through sixth phases designated by A, B, C, a, b, and c respectively. FIG. 7B is a table that sets forth one possible embodiment for the basic winding pattern for the six phases. The first row 705 shows the slot numbers (e.g. 1-66). The second row 710 shows an exemplary embodiment for the conductors near the slot openings with a capital letter (e.g. A-C) showing the first three phases and lower case for the second three phases (e.g. a-c). The third row 715 shows the conductors of the exemplary embodiment near the slot bottoms with a capital letter showing the first three phases and lower case for the second three phases. The fourth row 720 shows the corresponding electrical degrees for each slot with zero degree placed at slot number 1.

The first 3-phase winding is shown as A, B, and C. Phase A can start at slot 1, Phase B can start at slot 23, and Phase C can start at slot 45. The second 3-phase winding is shown as a, b, and c. Phase a can start at slot 19, Phase b can start at slot 41, and Phase c can start at slot 63.

Figure 7C:
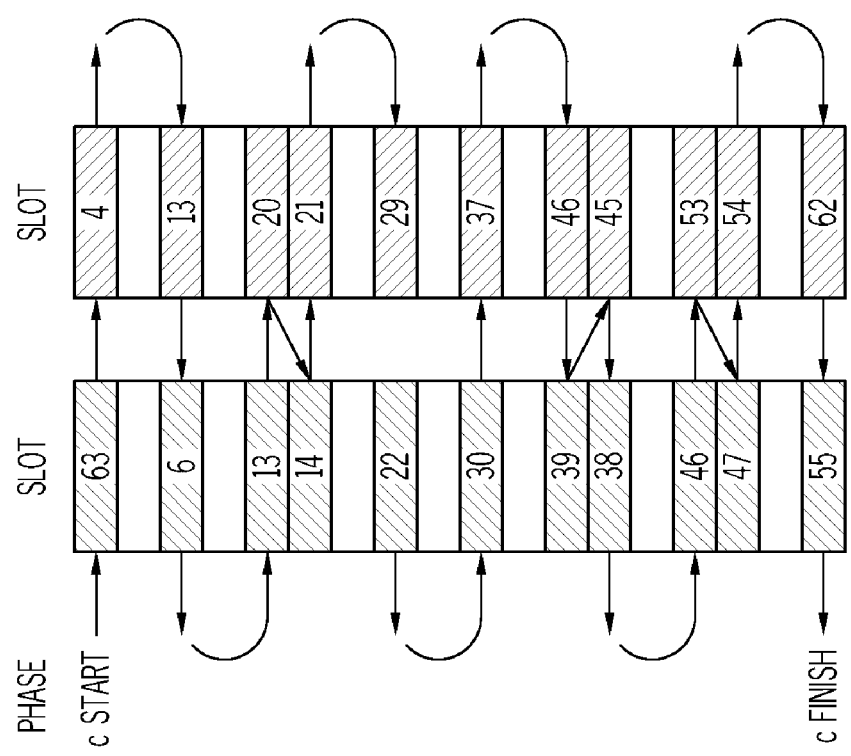
FIG. 7C shows the conductor connection sequence for Phase c of the 6-phase winding and shows a similar pattern to Phase a in accordance with an embodiment of the present invention.

FIG. 7C shows the conductor connection sequence for Phase c with a similar pattern to Phase a. The winding pattern can begin at slot 63 to 4 (e.g. a span of 7) completing a first coil group. Another single coil from slot 13 to slot 6 can complete a second coil group. Two series connected coils from slot 13 to slot 20 and from slot 14 to slot 21 can complete a third coil group. A single coil from slot 29 to slot 22 can complete a fourth coil group. Another single coil from slot 30 to slot 37 can complete a fifth coil group. Two series connected coils from slot 46 to slot 39 and from slot 45 to slot 38 can complete a sixth coil group. Two series connected coils from slot 46 to slot 53 and from slot 47 to slot 54 can compete a seventh coil group, and a single coil from slot 62 to slot 55 can complete a final eighth coil group.

Two perfect symmetrical three phase sets may be obtained from the above demonstration. Phases A, B and C may be exactly 120 electrical degrees apart with identical magnitude; Phases a, b, and c may also be exactly 120 electrical degrees apart with identical magnitude. The phase windings can produce a symmetrical magnitude for each phase within a phase group, but a different magnitude can exist for each of the phase groups. There may be a very small magnitude difference between the two sets, of less than 0.1 percent in this example. The phase shift between the two phase sets may also be slightly less than the ideal 30 electrical degrees, but these differences may be acceptable in practical engineering applications. Two phases can have a relative phase shift of 80 to 100 electrical degrees with 90 degrees being an exemplary relative phase shift.

In summary, in this architecture for a multi-phase armature winding, an asymmetrical coil winding configuration may produce a symmetrical phase balanced output. The design may allow increased flexibility and offer savings in weight and bulk. The design and the principle demonstrated are not limited to the pole numbers or slots numbers chosen in the above exemplary embodiment.

It should be understood, of course, that the foregoing relates to exemplary embodiments of the invention and that modifications may be made without departing from the spirit and scope of the invention as set forth in the following claims.

We claim:

1. A multi phase generator armature winding, comprising:
an asymmetrical armature coil winding for each pole with the associated phase organized into at least first and second three-phase winding groups, each winding group producing a symmetrical electrical output, each winding group being asymmetrically wound within slots in the armature with relation to remaining winding group(s);
the winding groups including clockwise-wound (CW-wound) coil groups and counterclockwise-wound (CCW-wound) coil groups;
the CCW coil groups including a set of two CCW-wound coils with a clockwise series connection between the two CCW-wound coils of each set, wherein the set of two CCW-wound coils include a first CCW-wound coil having a first span that overlaps a second span of a second CCW-wound coil; and
the phases of each three-phase winding group having an equal relative phase shift therebetween,
wherein a number of the windings that use a same slot varies between slots,
wherein within a plurality of phases in the winding groups, windings are asymmetrical to each other.

2. The generator winding of claim 1, further comprising:
a vector sum for each winding group for each pole varying but the vector sum of each phase being the same as the other phases,
wherein the number of the CCW coils under each pole is different.

3. The generator winding of claim 1, further comprising:
each conductor position within each winding group chosen according to an angle of the magnetomotive force vector property of each winding group, wherein a phase angle of a plurality of the conductor positions is different.

4. The generator winding of claim 1, wherein each winding for each pole is chosen according to the magnitude of a magnetomotive force vector.

5. The generator winding of claim 1, further comprising:
a resultant phase angle between each phase in a three-phase winding group equals 120 electrical degrees.

6. The generator winding of claim 1, further comprising:
two three-phase winding groups having a shift of 30 electrical degrees between the winding groups, wherein a six-phase armature winding is provided.

7. The generator winding of claim 6, wherein phase shift between two three phase winding groups does not equal an ideal 30 electrical degrees between the three phase winding groups, wherein the difference is operationally acceptable.

8. A multi phase power generator armature winding, comprising:
a multi phase winding with at least two sets of three phase winding groups of power output using asymmetrical coil windings, wherein slot assignments for a selected set are not equal to slot assignments for any other set under any rotation about the armature, wherein each set of the windings includes a first number of CW-wound coils and a second number of paired CCW-wound coils, each one of the pairs of CCW-wound coils having overlapping spans, and wherein the first and second numbers are different from one another,
wherein a resultant phase angle between each of the winding groups for each pole is different.

9. The generator of claim 8, wherein the two sets of phase windings are in phase.

10. The generator of claim 8, further comprising:
each set of the multi phase windings having a relative phase shift; and
a vector sum attribute for each winding group for each pole varying but the vector sum of each phase identical, with the asymmetrical coil windings producing a symmetrical electrical output.

11. The armature winding of claim 8, further comprising:
each winding group configuration for each pole chosen according to the magnitude of the magnetomotive force vector.

12. The armature winding of claim 8, further comprising:
each conductor constituting each winding group chosen according to the angle of the magnetomotive force vector.

13. The armature winding of claim 8, further comprising:
a symmetrical magnitude for each phase within a three phase winding group, but a different magnitude exists for each of the phase groups.

14. A multi phase power generator, comprising:
an armature having an asymmetrical coil configuration producing a balanced six phase power output;
each coil configuration organized as part of a three-phase winding group using conductors having an electrical degree relative phase shift between two or more phases, each winding group having a winding within slots of the generator, the winding of a selected winding group being asymmetrical with respect to the winding of the remaining group;
each coil configuration having a first plurality of CW-wound coils and a second plurality of CCW-wound coils, wherein the second plurality of CCW-wound coils includes a plurality of CCW-wound sets of two CCW-wound coils with a clockwise series connection between the two CCW-wound coils of each set, wherein the set of two CCW-wound coils include a first CCW-wound coil having a first span that overlaps and a second span of a second CCW-wound coil;
the first plurality being smaller than the second plurality; and
a vector sum for each three-phase winding group for each pole varying but the resultant phase angle between each phase is equal,
wherein each of the phases in each of the three-phase winding groups is implemented with unequal numbers of CCW wound coils and CW wound coils.

15. The multi phase power generator of claim 14, further comprising:
a winding configuration for each pole chosen based on a generated magnetomotive force vector.

16. The multi phase power generator of claim 14, wherein a generated phase angle between each phase of the three-phase winding group equals 120 degrees, and the number of slots varies from twice the number of poles times the number of phases based on a predetermined number of phases.

17. The multi phase power generator of claim 14, further comprising:
each winding for each phase within the three-phase winding group having the same span between conductors.

18. The multi phase power generator of claim 14, further comprising:
each winding for each phase within the three-phase winding group having different spans between conductors and the windings for a selected winding group being different from that of other winding groups.

* * * * *